(12) United States Patent
Aoki

(10) Patent No.: US 6,359,518 B1
(45) Date of Patent: Mar. 19, 2002

(54) SIGNAL LEVEL ADJUSTING CIRCUIT USING COUPLING STAGE FOR PREVENTING VARIATION FROM RESULTING IN EACH OPERATING POINT OF FIRST AMPLIFYING STAGE AND SECOND AMPLIFYING STAGE

(75) Inventor: Kazuharu Aoki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/566,233

(22) Filed: May 5, 2000

(30) Foreign Application Priority Data

May 10, 1999 (JP) .......................................... 11-129128

(51) Int. Cl.⁷ .............................. H03F 3/04; H03F 3/68
(52) U.S. Cl. ...................... 330/311; 330/300; 330/134; 330/133; 326/63; 326/21; 326/73
(58) Field of Search .............................. 330/133, 134, 330/300, 311; 326/63, 21, 73

(56) References Cited

U.S. PATENT DOCUMENTS 4,849,660 A  7/1989  Hayashi et al. .............. 307/475
5,317,214 A  * 5/1994  Lewis .......................... 326/63

FOREIGN PATENT DOCUMENTS

| EP | 242304 | * 4/1987 | ................. 330/311 |
| JP | 6434005 | * 3/1989 | ................. 330/300 |
| JP | 5110353 | * 4/1993 | ................. 330/134 |

* cited by examiner

Primary Examiner—Michael B Shingleton
(74) Attorney, Agent, or Firm—Brinks Hofer Gilson & Lione

(57) ABSTRACT

A signal level adjusting circuit includes a first amplifying stage in which output electrodes of output stage transistors are connected to ground through current supplies and are connected with respective output terminals, and a DC voltage at the output terminals has a first voltage value; a second amplifying stage in which control electrodes of input stage transistors are connected with respective input terminals, and a DC voltage at the input terminals has a second voltage value; and a coupling stage, connected between the output terminals and the input terminals, which includes at least one series resistor. The first amplifying stage is incorporated in a bipolar IC, and the second amplifying stage is incorporated in a CMOS IC.

14 Claims, 3 Drawing Sheets

US 6,359,518 B1

SIGNAL LEVEL ADJUSTING CIRCUIT USING COUPLING STAGE FOR PREVENTING VARIATION FROM RESULTING IN EACH OPERATING POINT OF FIRST AMPLIFYING STAGE AND SECOND AMPLIFYING STAGE

BACKGROUND OF THE INVENTION

1. Field of the Invention

The present invention relates to signal level adjusting circuits. More particularly, the present invention relates to signal level adjusting circuits for reducing the influence on connected amplifying stages that have connecting portions with different DC voltages, i.e. when the DC voltage at an output terminal of the first amplifying stage and the DC voltage at an input terminal of the second amplifying stage are different. The reduction is achieved by connecting a coupling stage having at least one series resistor between the output terminal of the first amplifying stage and the input terminal of the second amplifying stage.

2. Description of the Related Art

Generally, cellular telephones contain circuitry including a bipolar integrated circuit (IC) and a complementary metal oxide semiconductor (CMOS) IC. The bipolar IC includes an automatic gain control (AGC) amplifier, a quadrature phase-shift keying (QPSK) demodulator, and a buffer amplifier, while the CMOS IC includes an input amplifier, a low-pass filter, and an analog-to-digital (A/D) converter. An output terminal of the buffer amplifier in the bipolar IC and an input terminal of the input amplifier in the CMOS IC are coupled.

FIG. 2 is a block diagram illustrating critical portions of the cellular telephone described above. Referring to FIG. 2, the cellular telephone includes a radio frequency (RF) signal input terminal 20, a radio frequency amplifier (RF AMP) 21, a frequency mixer (MIX) 22, a local oscillator (LO OSC) 23, a buffer amplifier 24, a bipolar IC 25, a CMOS IC 26, a mobile station model (MSM) 27, and a signal output terminal 28. The bipolar IC 25 includes an automatic gain control amplifier (AGC AMP) 29, a QPSK demodulator 30, an output buffer amplifier 31, a signal input terminal 32, and two signal output terminals $33_1$ and $33_2$. The CMOS IC 26 includes an input amplifier 34, a low-pass filter (LF) 35, an analog-to-digital converter (A/D) 36, two signal input terminals $37_1$ and $37_2$, and a signal output terminal 38.

The RF AMP 21 has an input terminal connected with the RF signal input terminal 20 and an output terminal connected with a first input terminal of the MIX 22. The MIX 22 has a second input terminal connected with an output terminal of the buffer amplifier 24 and an output terminal connected with the signal input terminal 32. The LO OSC 23 has an output terminal connected with an input terminal of the buffer amplifier 24. The AGC AMP 29 has an input terminal connected with the signal input terminal 32 and an output terminal connected with an input terminal of the QPSK demodulator 30. The output buffer amplifier 31 has two input terminals connected with two output terminals, respectively, of the QPSK demodulator 30, and two output terminals connected with the signal output terminals $33_1$ and $33_2$, respectively. The input amplifier 34 has two input terminals connected with the signal input terminals $37_1$ and $37_2$, respectively, and an output terminal connected with an input terminal of the LF 35. The A/D 36 has an input terminal connected with an output terminal of the LF 35 and an output terminal connected with the signal output terminal 38. The MSM 27 has an input terminal connected with the signal output terminal 38 and an output terminal connected with the signal output terminal 28. Connecting lines (no reference numeral) interconnect the signal output terminals $33_1$ and $33_2$ and the signal input terminals $37_1$ and $37_2$, respectively.

A cellular telephone having the above construction operates as follows: when a received RF signal is applied to the RF signal input terminal 20, the RF signal is amplified by the RF AMP 21 and is subsequently supplied to the MIX 22. Simultaneously, a local oscillation signal generated by the LO OSC 23 is supplied to the MIX 22 via the buffer amplifier 24. The MIX 22 mixes the RF signal and the local oscillation signal and outputs an intermediate frequency (IF) signal of the difference frequency to the bipolar IC 25. The IF signal supplied to the bipolar IC 25 is amplified by the AGC AMP 29, and the amplified IF signal is demodulated by the QPSK demodulator 30 to form a demodulation signal. The demodulation signal is amplified by the output buffer amplifier 31 and is output from the bipolar IC 25 to the subsequent CMOS IC 26. The input amplifier 34 amplifies the demodulation signal supplied to the CMOS IC 26 and subsequently, unwanted frequency components are removed from the amplified signal by the LF 35. The demodulation signal then undergoes analog-to-digital conversion by the A/D 36 to form a digital signal. The digital signal is supplied to the signal output terminal 38. The digital signal is converted into an available signal by the MSM 27, and is supplied from the signal output terminal 38 to an external circuit (not shown).

FIG. 3 is a circuit diagram of a detailed construction of the coupling portion between the output buffer amplifier 31 of the bipolar IC 25 and the input amplifier 34 of the CMOS IC 26. Referring to FIG. 3, the output buffer amplifier 31 includes a first bipolar transistor $31_1$, a second bipolar transistor $31_2$, a first current supply $31_3$ connected between an emitter of the first bipolar transistor $31_1$ and ground, and a second current supply $31_4$ connected between an emitter of the second bipolar transistor $31_2$ and ground. The first bipolar transistor $31^{31}$ and the second bipolar transistor $31_2$ form a balanced amplifying circuit. The signal output terminals 33, and 332 of the bipolar IC 25 are connected with the emitters of the first bipolar transistor $31_1$ and the second bipolar transistor $31_2$, respectively. The input amplifier 34 includes a first MOS field effect transistor (MOSFET) $34_1$ and a second MOSFET $34_2$. The first MOSFET $34_1$ and the second MOSFET $34_2$ form a balanced amplifying circuit. The signal input terminals $37_1$ and $37_2$ of the CMOS IC 26 are connected with gates of the first MOSFET $34_1$ and the second MOSFET $34_2$, respectively. The same reference numerals are given to the same components as those shown in FIG. 2.

The operation of the coupling portion between the output buffer amplifier 31 and the input amplifier 34 is described below. When a balanced demodulation signal is supplied to bases of the first bipolar transistor $31_1$ and the second bipolar transistor $31_2$, the emitter-follower-connected first and second bipolar transistors $31_1$ and $31_2$ amplify the demodulation signal. The amplified balanced demodulation signal is supplied from the emitters of the first and second bipolar transistors $31_1$ and $31_2$ to the signal output terminals $33_1$ and $33_2$, respectively. Subsequently, the balanced demodulation signal is transmitted from the signal output terminals $33_1$ and $33_2$ through the connecting lines to the signal input terminals $37_1$ and $37_2$, respectively. The balanced demodulation signal at the signal input terminals $37_1$ and $37_2$ is supplied to gates of the source-grounded first and second MOSFETs $34_1$ and $34_2$, respectively, which form a balanced amplifying circuit. The first MOSFET $34_1$ and the second MOSFET $34_2$ amplify the balanced demodulation signal.

The coupling portion between the output buffer amplifier 31 and the input amplifier 34 in the cellular telephone is arranged such that the output buffer amplifier 31 is a part of the bipolar IC 25 and the input amplifier 34 is a part of the CMOS IC 26. In this case, the supply voltage driving the bipolar IC 25 may be different from the supply voltage driving the CMOS IC 26. This may cause a difference between a DC voltage $V_1$ obtained at the signal output terminals $33_1$ and $33_2$ of the bipolar IC 25 and a DC voltage $V_2$ obtained at the signal input terminals $37_1$ and $37_2$ of the CMOS IC 26. When connecting lines interconnect the signal output terminals $33_1$ and $33_2$ and the signal input terminals $37_1$ and $37_2$ having different DC voltages, an electrical current flows through the connecting lines from the higher DC voltage ends (e.g., the signal input terminals $37_1$ and $37_2$) to the lower DC voltage ends (e.g., the signal output terminals $33_1$ and $33_2$). As a result, operating points of the first bipolar transistor $31_1$, the second bipolar transistor $31_2$, the first MOSFET $34_1$, and the second MOSFET $34_2$ are shifted.

An example of the DC voltage $V_1$ obtained at the signal output terminals $33_1$ and $33_2$ and the DC voltage $V_2$ obtained at the signal input terminals $37_1$ and $37_2$ is described below. If the first and second bipolar transistors $31_1$ and $31_2$ each have an emitter current value of 0.8 mA and the first and second current supplies $31_3$ and $31_4$ each have a current value of 0.8 mA, the DC voltage $V_1$ obtained at the signal output terminals 33, and $33_2$ is approximately 1.0 V. In contrast, the DC voltage $V_2$ obtained at the signal input terminals $37_1$ and $37_2$ is normally about 1.7 V. Hence, there is a difference of approximately $_{0.7}$ V between the two DC voltages $V_1$ and $V_2$. When the signal output terminals $33_1$ and $33_2$ and the signal input terminals $37_1$ and $37_2$ are respectively connected by the connecting lines, an electrical current flows through the connecting lines from the signal input terminals $37_1$ and $37_2$ to the signal output terminals $33_1$ and $33_2$, respectively. As a result, the current values of the first current supply $31_3$ and the second current supply $31_4$ are substantially increased from the original value of approximately 0.8 mA, and the DC voltage $V_2$ at the signal input terminals $37_1$ and $37_2$ is decreased depending on the current flowing into the connecting lines. This causes variations in the operating points of the first bipolar transistor $31_1$, the second bipolar transistor 312, the first MOSFET $34_1$, and the second MOSFET $34_2$.

SUMMARY OF THE INVENTION

Accordingly, an object of the present invention is to provide a signal level adjusting circuit having a coupling stage in which there is no variation between operating points of a first amplifying stage, in a previous stage, and a second amplifying stage, in a subsequent stage, when the first and second amplifying stages are interconnected by the coupling stage.

To this end, according to the present invention, a signal level adjusting circuit is provided. The signal level adjusting circuit includes a first amplifying stage having a low output impedance, in which an output electrode of an output stage transistor is connected both to an output terminal and to ground through a current supply. The output terminal has a DC voltage with a first voltage value. The signal level adjusting circuit also includes a second amplifying stage having a high input impedance, in which a control electrode of an input stage transistor is connected with an input terminal, and a DC voltage at the input terminal has a second voltage value differing from the first voltage value, and a coupling stage including at least one series resistor, which is connected between the output terminal and the input terminal.

The first amplifying stage comprises a bipolar IC and the second amplifying stage comprises a CMOS IC. The series resistor may be selected such that, when the coupling stage is connected between the output terminal and the input terminal, a current flowing through the series resistor in the coupling stage is not greater than 10% of a current flowing through the current supply prior to connection of the coupling stage.

The coupling stage including at least one series resistor may be connected between the output terminal, connected with the output electrode of the output stage transistor, and the input terminal, connected with the control (input) electrode of the input stage transistor. The series resistor absorbs the voltage difference between a first DC voltage applied to the output terminal and a second DC voltage applied to the input terminal. Since the coupling stage is connected no variation occurs between operating points of the output stage transistor and the input stage transistor.

DESCRIPTION OF THE PREFERRED EMBODIMENT

The present invention will become clear from the following description of the preferred embodiment with reference to the accompanying drawings.

Figure 1:
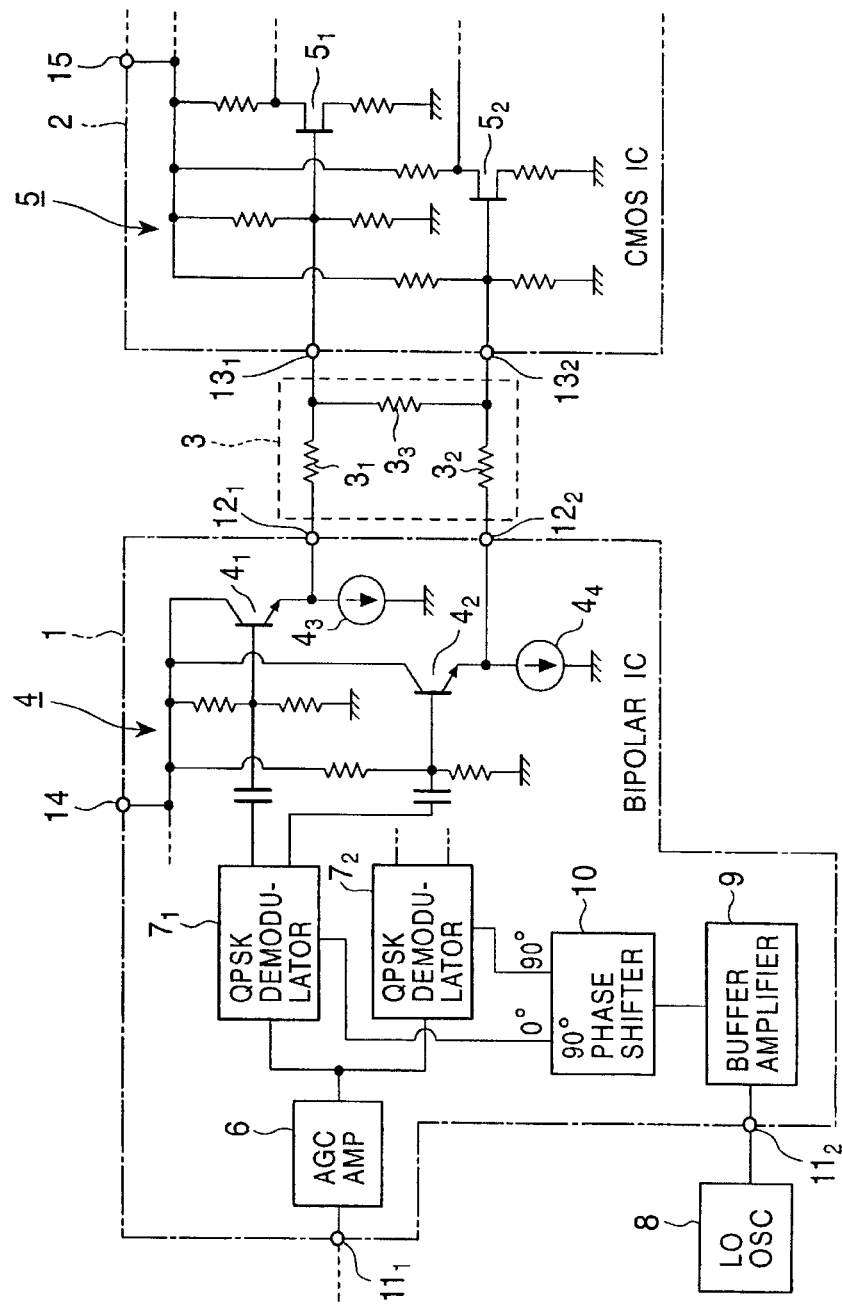
FIG. 1 is a circuit diagram of a signal level adjusting circuit according to an embodiment of the present invention.
Figure 2:
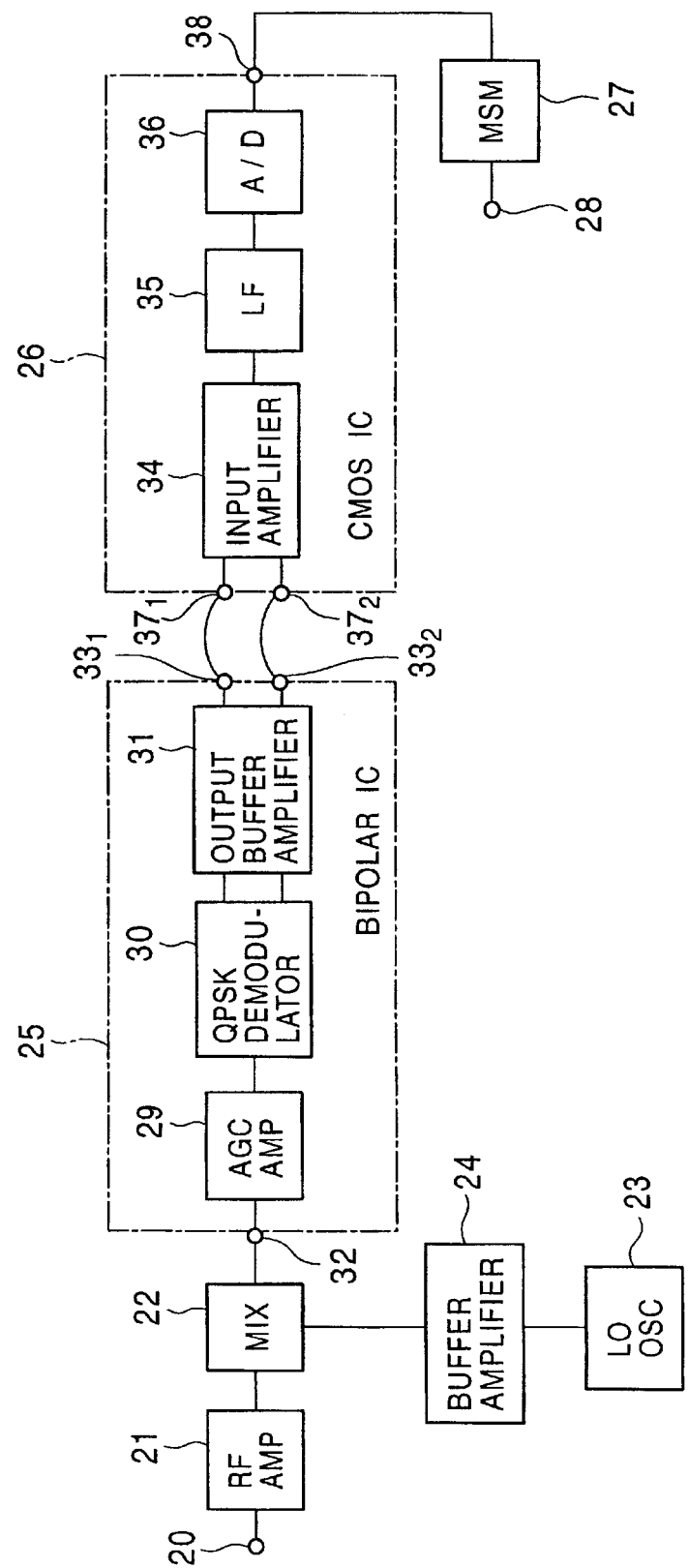
FIG. 2 is a block diagram of an example of the construction of critical portions of a known cellular telephone.
Figure 3:
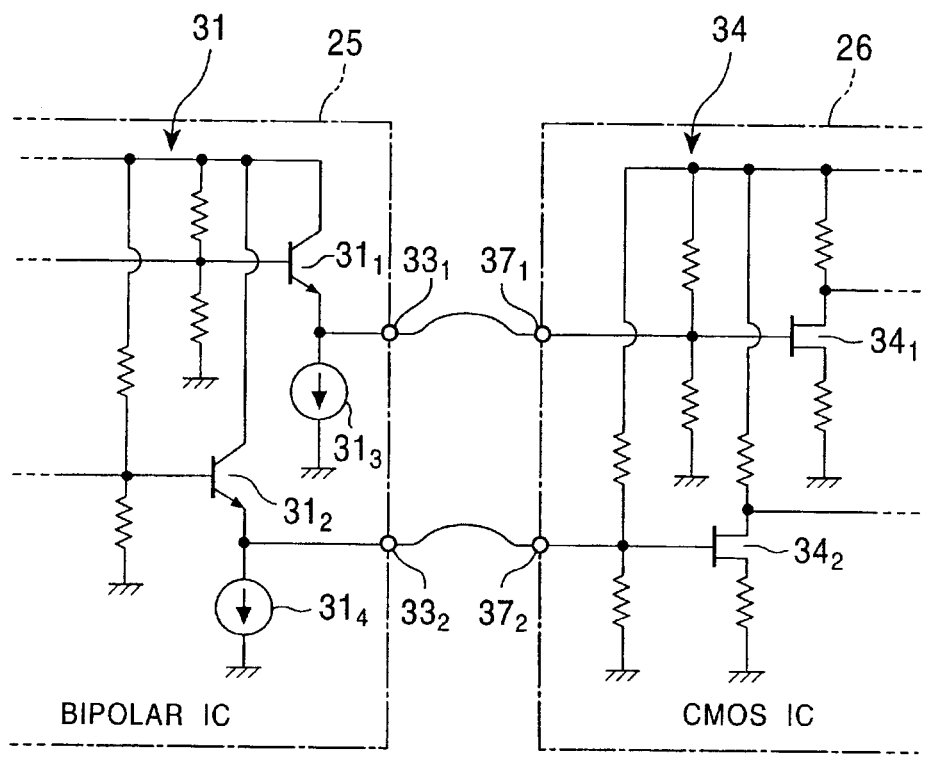
FIG. 3 is a circuit diagram of the detailed construction of a coupling portion between an output buffer amplifier of a bipolar IC and an input amplifier of a CMOS IC shown in FIG. 2.

FIG. 1 is a circuit diagram of a signal level adjusting circuit according to an embodiment of the present invention, which is used for a demodulation signal amplifying stage of a cellular telephone. Referring to FIG. 1, the signal level adjusting circuit includes a bipolar IC 1, a CMOS IC 2, and a coupling stage 3. The bipolar IC 1 includes an output buffer amplifier (first amplifying stage) 4, an AGC amplifier (AGC AMP) 6, a pair of QPSK demodulators $7_1$ and $7_2$, a buffer amplifier 9, a 90° phase shifter 10, an IF signal input terminal $11_1$, a local oscillation signal input terminal $11_2$, and signal output terminals $12_1$ and $12_2$. The CMOS IC 2 includes an input amplifier (second amplifying stage) 5 and signal input terminals $13_1$ and $13_2$. The coupling stage 3 includes a first series resistor $3_1$, a second series resistor $3_2$, and a shunt resistor $3_3$. The output buffer amplifier 4 includes a first bipolar transistor $4_1$, a second bipolar transistor $4_2$, a first current supply $4_3$, and a second current supply $4_4$. The input amplifier includes a first MOSFET $5_1$ and a second MOSFET $5_2$.

In the bipolar IC 1, the AGC AMP 6 has an input terminal connected with the IF signal input terminal $11_1$ and output terminals connected with first input terminals, respectively, of the pair of QPSK demodulators $7_1$ and $7_2$. The QPSK demodulator $7_1$ has a second input terminal connected with a 0° signal output terminal of the 90° phase shifter 10 and an output terminal connected with a first input terminal of the output buffer amplifier 4. Another QPSK demodulator $7_2$ has a second input terminal connected with a 90° signal output terminal of the 90° phase shifter 10 and an output terminal connected with a second input terminal of the output buffer amplifier 4. The buffer amplifier 9 has an input terminal connected with the local oscillating signal input terminal $11_2$ and an output terminal connected with an input terminal of the 90° phase shifter 10. The local oscillation signal input terminal $11_2$ is connected with an output terminal of an externally-connected LO OSC 8.

In the coupling stage 3, the first series resistor $3_1$ is connected between the signal output terminal $12_1$ and the signal input terminal $13_1$; the second series resistor $3_2$ is connected between the signal output terminal $12_2$ and the signal input terminal $13_2$; and the shunt resistor $3_3$ is connected between the signal input terminal $13_1$ and the signal input terminal $13_2$.

In the output buffer amplifier 4, the base of the first bipolar transistor $4_1$ is connected with the first input terminal of the buffer amplifier 4 via a first coupling capacitor (no reference numeral). A collector of the first bipolar transistor $4_1$ is connected with a power supply terminal 14. An emitter of the first bipolar transistor $4_1$ is connected with the signal output terminal $12_1$ and is connected with ground via the first current supply $4_3$. The base of the second bipolar transistor $4_2$ is connected with the second input terminal of the buffer amplifier 4 via a second coupling capacitor (no reference numeral). A collector of the second bipolar transistor $4_2$ is connected with the power supply terminal 14. An emitter of the second bipolar transistor $4_2$ is connected with the signal output terminal $12_2$ and is connected to ground via the second current supply $4_4$. In this arrangement, the first bipolar transistor $4_1$ and the second bipolar transistor $4_2$ operate as an emitter follower. Hence, the output impedance of the output buffer amplifier 4 observed from the signal output terminals $12_1$ and $12_2$ is low.

In the input amplifier 5 of the CMOS IC 2, the gate of the first MOSFET $5_1$ is connected with the signal input terminal $13_1$. A drain of the first MOSFET $5_1$ is connected with a power supply terminal 15 via a first load resistor (no reference numeral). A source of the first MOSFET $5_1$ is connected with ground via a first source resistor (no reference numeral). The gate of the second MOSFET $5_2$ is connected with the signal input terminal $13_2$. A drain of the second MOSFET $5_2$ is connected with a power supply terminal 15 via a second load resistor (no reference numeral). A source of the second MOSFET $5_2$ is connected with ground via a second source resistor (no reference numeral). In this arrangement, the input impedance of the input amplifier 5 i.e. the input impedance of the first MOSFET $5_1$ and the second MOSFET $5_2$, observed from the signal input terminals $13_1$ and $31_2$ is high.

The operation of the signal level adjusting circuit is described herein. When an IF signal formed in a previous stage circuit (not shown) is supplied to the IF signal input terminal $11_1$ of the bipolar IC 1, the IF signal is amplified by the AGC AMP 6. The amplified IF signal is supplied to the QPSK demodulators $7_1$ and $7_2$. A local oscillation signal generated by the LO OSC 8 is supplied through the buffer amplifier 9 to the 90° phase shifter 10. Simultaneously, a 0° phase local oscillation signal output from the 0° signal output terminal of the 90° phase shifter 10 is supplied to the QPSK demodulator $7_1$. The QPSK demodulator $7_1$ demodulates the supplied IF signal with the 0° phase local oscillation signal, and outputs two demodulation signals, i.e., one with a 0° phase and the other with a 180° phase (hereinafter referred to as a first demodulation signal and a second demodulation signal, respectively). Similarly, a 90° phase local oscillation signal output from the 90° signal output terminal of the 90° phase shifter 10 is supplied to the QPSK demodulator $7_2$. The QPSK demodulator $7_2$ demodulates the supplied IF signal with the 90° phase local oscillation signal, and outputs two demodulation signals, i.e., one with a 90° phase and the other with a 270° phase (hereinafter referred to as a third demodulation signal and a fourth demodulation signal, respectively). The emitter-follower-connected first bipolar transistor $4_1$ in the output buffer amplifier 4 amplifies the first demodulation signal, and the amplified first demodulation signal is supplied to the signal output terminal $12_1$. The emitter-follower-connected second bipolar transistor $4_2$ in the output buffer amplifier 4 amplifies the second demodulation signal and the amplified second demodulation signal is supplied to the signal output terminal 122.

Although not shown in FIG. 1, a third emitter-follower-connected bipolar transistor amplifies the third demodulation signal and the amplified third demodulation signal is supplied to a third signal output terminal. Similarly, a fourth emitter-follower connected bipolar transistor amplifies the fourth demodulation signal and the amplified fourth demodulation signal is supplied to a fourth signal output terminal.

The first demodulation signal supplied to the signal output terminal $12_1$ of the bipolar IC 1 is supplied to the signal input terminal $13_1$ of the CMOS IC 2 through the first series resistor $3_1$ of the coupling stage 3. Similarly, the second demodulation signal supplied to the signal output terminal $12_2$ of the bipolar IC 1 is supplied to the signal input terminal $13_2$ of the CMOS IC 2 through the second series resistor $3_2$ of the coupling stage 3. Subsequently, the first demodulation signal at the signal input terminal $13_1$ is supplied to the source-grounded first MOSFET 51, and the first MOSFET $5_1$ amplifies the supplied first demodulation signal. The amplified first demodulation signal is supplied from the drain of the first MOSFET $5_1$ to a subsequent circuit. Similarly, the second demodulation signal at the signal input terminal $13_2$ is supplied to the source-grounded second MOSFET $5_2$, and the second MOSFET $5_2$ amplifies the supplied second demodulation signal. The amplified second demodulation signal is supplied from the drain of the second MOSFET $5_2$ to a subsequent circuit.

Although not shown in FIG. 1, the third and fourth demodulation signals are transmitted from the bipolar IC 1 to the CMOS IC 2 through a coupling stage which is similar to the coupling stage 3, are amplified by MOSFETs in a similar arrangement as the first MOSFET $5_1$ and the second MOSFET $5_2$, and are supplied to a subsequent circuit.

In the signal level adjusting circuit of the embodiment, a DC voltage $V_1$ obtained at the signal output terminals $12_1$ and $12_2$ of the bipolar IC 1 and a DC voltage $V_2$ obtained at the signal input terminals $13_1$ and $13_2$ of the CMOS IC 2 are different. For example, when the emitters of the first and second bipolar transistor $4_1$ and $4_2$ and the first and second current supplies $4_3$ and $4_4$ each source a current of 0.8 mA, the DC voltage $V_1$ obtained at the signal output terminals $12_1$ and $12_2$ is approximately 1.0 V, and the DC voltage $V_2$ obtained at the signal input terminals $13_1$ and $13_2$ is normally about 1.7 V. As a result, the difference between the two DC voltages $V_1$ and $V_2$ is approximately 0.7 V.

In this embodiment, the coupling stage 3 is connected between the signal output terminals $12_1$ and $12_2$ and the signal input terminals $13_1$ and $13_2$, thus connecting the first series resistor $3_1$ between the signal output terminal $12_1$ and the signal input terminal $13_1$ and the second series resistor $3_2$ between the signal output terminal $12_2$ and the signal input terminal $13_2$. By selecting resistance values of the first and second series resistors $3_1$ and $3_2$ in the coupling stage 3, the voltage difference between the signal output terminals $12_1$ and $12_2$ and the signal input terminals $13_1$ and $13_2$ is absorbed by the first series resistor $3_1$ and the second series resistor $3_2$.

Therefore, there is little, if any, variation between the operating points of the first and second bipolar transistors $4_1$ and $4_2$ in the first amplifying stage 4 and of the first and second MOSFETs $5_1$ and $5_2$ in the second amplifying stage 5. Furthermore, the first and second current sources $4_3$ and $4_4$ after connecting the coupling stage 3 preferably do not vary more than 10% from the currents before connecting the coupling stage 3.

Although the shunt resistor $3_3$ is connected in the coupling stage 3 of the embodiment, the shunt resistor $3_3$ is provided only for removing any difference between the DC voltages at the signal input terminals $13_1$ and $13_2$. The coupling stage 3 may also be formed without the shunt resistor $3_3$.

This application herein claims priority from and incorporates by reference Japanese Patent Application No. 11-129128, filed May 10, 1999.

The present invention has been described in connection with an embodiment in which the signal level adjusting circuit is applied between amplifying stages for demodulation of signals in a cellular telephone. However, it will be understood by those skilled in the art that it is not intended to limit the invention to that embodiment. This is to say that the embodiment is illustrative of the invention and not to be construed as limiting the invention. Various modifications and applications may occur to those skilled in the art without departing from the true spirit and scope of the invention as defined in the appended claims.

What is claimed is:

1. A signal level adjusting circuit comprising:
   a first amplifying stage having a low output impedance, an output electrode of an output stage transistor in the first amplifying stage being connected with an output terminal, and a first DC voltage at the output terminal of the first amplifying stage having a first voltage value;
   a second amplifying stage having a high input impedance, a control electrode of an input stage transistor in the second amplifying stage being connected with an input terminal, a second DC voltage at the input terminal of the second amplifying stage having a second voltage value, the second voltage differing from the first voltage value, and a biasing resistor connected between the input terminal of the second amplifying stage and a power supply terminal of the second amplifying stage; and
   a coupling stage having a series resistor the output terminal of the first amplifying stage and the input terminal of the second amplifying stage directly connected through the series resistor.

2. A signal level adjusting circuit as set forth in claim 1, said first amplifying stage further comprising a bipolar IC, and said second amplifying stage further comprising a CMOS IC.

3. A signal level adjusting circuit as set forth in claim 1, the series resistor being selected such that, when said coupling stage is connected between the output terminal of the first amplifying stage and the input terminal of the second amplifying stage, a current flowing through the series resistor in said coupling stage is not greater than 10% of a current flowing through a current supply prior to connection of said coupling stage, the current supply connected between the first amplifying stage and ground.

4. A signal level adjusting circuit as set forth in claim 1, said first amplifying stage and said second amplifying stage forming a balanced amplifying circuit and said coupling stage forming a balanced coupling circuit having a plurality of series resistors.

5. A signal level adjusting circuit as set forth in claim 1, further comprising a QPSK demodulation signal amplified initially by said first amplifying stage and subsequently amplified by said second amplifying stage.

6. A signal level adjusting circuit as set forth in claim 1, said first amplifying stage being connected with ground through a current supply.

7. A signal level adjusting circuit comprising:
   a first amplifying stage comprising a bipolar IC and having a low output impedance, an output electrode of an output stage transistor in the first amplifying stage being connected to ground through a current supply and being connected with an output terminal, and a first DC voltage at the output terminal of the first amplifying stage having a first voltage value;
   a second amplifying stage comprising a CMOS IC and having a high input impedance, a control electrode of an input stage transistor in the second amplifying stage being connected with an input terminal, a second DC voltage at the input terminal of the second amplifying stage having a second voltage value, the second voltage differing from the first voltage value, and a biasing resistor connected between the input terminal of the second amplifying stage and a power supply terminal of the second amplifying stage; and
   a coupling stage having a series resistor, the output terminal of the first amplifying stage and the input terminal of the second amplifying stage directly connected through the series resistor, the series resistor being selected such that, when said coupling stage is connected between the output terminal of the first amplifying stage and the input terminal of the second amplifying stage, a current flowing through the series resistor in said coupling stage is not greater than 10% of a current flowing through the current supply prior to connection of said coupling stage, the current supply connected between the first amplifying stage and ground, said first amplifying stage and said second amplifying stage forming a balanced amplifying circuit and said coupling stage forming a balanced coupling circuit having a plurality of series resistors, said first amplifying stage and said second amplifying stage amplifying a QPSK demodulation signal.

8. A method for adjusting a signal level in a circuit comprising decreasing a difference between a first operating voltage of an output terminal of a first amplifying circuit and a second operating voltage of an input terminal of a second amplifying circuit using a coupling stage having a series resistor by directly connecting the output terminal of the first amplifying stage and the input terminal of the second amplifying stage via the series resistor, and providing a biasing and resistive connection between the input terminal of the second amplifying circuit and a power supply voltage terminal.

9. The method of claim 8, further comprising:
   connecting an output electrode of an output stage transistor in the first amplifying stage to ground through a current supply, the first amplifying stage having a low output impedance;

connecting the output electrode of the output stage transistor in the first amplifying stage with the output terminal, a first DC voltage at the output terminal of the first amplifying stage having a first voltage value; and connecting a control electrode of an input stage transistor in the second amplifying stage with the input terminal, the second amplifying stage having a high input impedance, a second DC voltage at the input terminal of the second amplifying stage having a second voltage value, the second voltage differing from the first voltage value.

10. The method of claim 9, further comprising selecting the series resistor such that, when said coupling stage is connected between the output terminal of the first amplifying stage and the input terminal of the second amplifying stage, a current flowing through the series resistor in said coupling stage is not greater than 10% of a current flowing through the current supply prior to connection of said coupling stage.

11. The method of claim 8, further comprising forming a balanced amplifying circuit using said first amplifying stage and said second amplifying stage and forming a balanced coupling circuit having a plurality of series resistors using said coupling stage.

12. The method of claim 8, further comprising amplifying a QPSK demodulation signal using said first amplifying stage and said second amplifying stage.

13. A signal level adjusting circuit as set forth in claim 4, the coupling circuit further comprising a shunt resistor connected between the series resistors, the shunt resistor more proximate to the second amplifying stage than either of the series resistors.

14. The method of claim 11, further comprising shunting current between terminals of the coupling circuit via a shunt resistor connected between the series resistors and disposed more proximate to the second amplifying stage than either of the series resistors.

* * * * *

UNITED STATES PATENT AND TRADEMARK OFFICE
CERTIFICATE OF CORRECTION

PATENT NO. : 6,359,518 B1
DATED : March 19, 2002
INVENTOR(S) : Kazuharu Aoki

Page 1 of 1

It is certified that error appears in the above-identified patent and that said Letters Patent is hereby corrected as shown below:

<u>Title page,</u>
Item [56], References Cited, FOREIGN PATENT DOCUMENTS, delete "3/1989" and substitute -- 2/1989 -- in its place.

Signed and Sealed this

First Day of October, 2002

Attest:

Attesting Officer

JAMES E. ROGAN
*Director of the United States Patent and Trademark Office*